United States Patent
Tian et al.

(10) Patent No.: US 11,048,976 B2
(45) Date of Patent: Jun. 29, 2021

(54) METHOD AND SYSTEM FOR CONTROLLING MACHINES BASED ON OBJECT RECOGNITION

(71) Applicant: Midea Group Co., Ltd., Foshan (CN)

(72) Inventors: Yunke Tian, Santa Clara, CA (US); Thanh Huy Ha, Milpitas, CA (US); Zhicai Ou, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 95 days.

(21) Appl. No.: 16/680,347

(22) Filed: Nov. 11, 2019

(65) Prior Publication Data

US 2021/0142110 A1    May 13, 2021

(51) Int. Cl.
*G06K 9/00* (2006.01)
*G06K 9/62* (2006.01)
(Continued)

(52) U.S. Cl.
CPC ......... *G06K 9/6257* (2013.01); *G06K 9/4671* (2013.01); *G06K 9/6227* (2013.01);
(Continued)

(58) Field of Classification Search
CPC .... G06K 9/6257; G06K 9/6269; G06K 9/202; G06K 9/222; G06K 9/2011; G06K 9/72;
(Continued)

(56) References Cited

U.S. PATENT DOCUMENTS

| 5,657,424 A  * | 8/1997 | Farrell ............... G10L 15/05 704/232 |
| 7,319,779 B1 * | 1/2008 | Mummareddy ... G06K 9/00288 382/118 |

(Continued)

FOREIGN PATENT DOCUMENTS

| CN | 105956512 A | 9/2016 |
| CN | 106192289 A | 12/2016 |

(Continued)

OTHER PUBLICATIONS

Midea Group Co. Ltd., International Search Report and Written Opinion, PCT/CN2020/102857, dated Oct. 23, 2020, 8 pgs.

*Primary Examiner* — Amir Alavi
(74) *Attorney, Agent, or Firm* — Morgan, Lewis & Bockius LLP

(57) ABSTRACT

A method includes: capturing one or more images of an unorganized collection of items inside a first machine; determining one or more item types of the unorganized collection of items from the one or more images, comprising: dividing a respective image in the one or more images into a respective plurality of sub-regions; performing feature detection on the respective plurality of sub-regions to obtain a respective plurality of regional feature vectors, wherein a regional feature vector for a sub-region indicates characteristics for a plurality of predefined local item features for the sub-region; generating an integrated feature vector by combining the respective plurality of regional feature vectors; and applying a plurality of binary classifiers to the integrated
(Continued)

feature vector; and selecting a machine setting for the first machine based on the determined one or more clothes type in the unorganized collection of items.

18 Claims, 9 Drawing Sheets

(51) Int. Cl.
*G06K 9/46* (2006.01)
*G06N 3/04* (2006.01)
*G06N 3/08* (2006.01)

(52) U.S. Cl.
CPC ......... *G06K 9/6259* (2013.01); *G06K 9/6269* (2013.01); *G06N 3/04* (2013.01); *G06N 3/08* (2013.01)

(58) Field of Classification Search
CPC .... G06K 9/4609; G06K 9/48; G06K 9/00718; G06K 9/00797; G06T 7/0083; G06T 2207/10016; H04N 1/40062; G06F 17/3024; G06F 17/30257; G11B 27/28
See application file for complete search history.

(56) References Cited

U.S. PATENT DOCUMENTS

| | | | | |
|---|---|---|---|---|
| 8,391,602 B2* | 3/2013 | Chaki | ................. | G06K 9/222 |
| | | | | 382/177 |
| 8,406,470 B2* | 3/2013 | Jones | ................. | G06K 9/00201 |
| | | | | 382/103 |
| 8,582,897 B2* | 11/2013 | Sabe | ................. | G06F 16/5838 |
| | | | | 382/229 |
| 8,718,362 B2* | 5/2014 | Tuzel | ................. | G06K 9/4609 |
| | | | | 382/170 |
| 8,873,812 B2* | 10/2014 | Larlus-Larrondo | ....... | G06T 7/11 |
| | | | | 382/118 |
| 9,158,992 B2* | 10/2015 | Lu | ................. | G06K 9/6256 |
| 9,443,320 B1* | 9/2016 | Gaidon | ................. | G06K 9/3233 |
| 9,600,711 B2* | 3/2017 | Shreve | ................. | G06K 9/00771 |
| 9,792,823 B2* | 10/2017 | Zhuang | ................. | G10L 15/26 |
| 10,037,456 B2* | 7/2018 | Friedland | ................. | G06K 9/4642 |
| 2019/0304099 A1 | 10/2019 | Hever et al. | | |

FOREIGN PATENT DOCUMENTS

| | | |
|---|---|---|
| CN | 108385330 A | 8/2018 |
| CN | 109594288 A | 4/2019 |
| CN | 110331551 A | 10/2019 |

* cited by examiner

600

At a first machine having one or more processors, a camera, and memory 602

Capture one or more images of an unorganized collection of items inside the first machine 604

Determine one or more item types of the unorganized collection of items from the one or more images 606, including:

Divide a respective image in the one or more images into a respective plurality of sub-regions 608

Perform feature detection on the respective plurality of sub-images of the respective image to obtain a respective plurality of regional feature vectors, wherein a regional feature vector for a sub-region indicates characteristics for a plurality of predefined local item features for the sub-region 610

Generate an integrated feature vector for the respective image by combining the respective plurality of regional feature vectors 612

Apply a plurality of binary classifiers to the integrated feature vector for the respective image, wherein a respective binary classifier of the plurality of binary classifiers is configured to receive the integrated feature vector and determine if an item type associated with the binary classifier exists in the respective image based on the integrated feature vector for the respective image 614

Select a machine setting for the first machine based on the determined one or more item types in the unorganized collection of items 616

Figure 6

METHOD AND SYSTEM FOR CONTROLLING MACHINES BASED ON OBJECT RECOGNITION

FIELD OF THE TECHNOLOGY

The present disclosure relates to the field of controlling machines based on object recognition, and in particular, to systems and methods for developing image processing models to detect/recognize objects and automatically operating a machine based on the detected/recognized objects.

BACKGROUND OF THE TECHNOLOGY

Machines such as home appliances often have different predefined operational settings. For example, washing machines have multiple washer cycle settings with different water temperatures, tumbling speed, spin speed, and so on. Microwave ovens have multiple cooking settings with different microwave power levels and cooking times. Selecting an appropriate setting is important for optimizing the performance of a machine. For example, selecting an appropriate washer cycle setting for a load of laundry is important in preventing damages to clothes (e.g., stretching, shrinking, or discoloration) and achieving optimal cleaning results. Manual selection of appropriate settings for a machine can be challenging for inexperienced users of the machine and may result in less than optimal outcome (e.g., damaged clothes or improperly cooked food).

Machine learning models such as convolutional neural networks (CNNs) and their variations are powerful image processing models, and are widely used for object detection tasks. These machine learning models are often end-to-end models which receive images as inputs and directly output detected object types. However, training an end-to-end machine learning model requires a large amount of labeled data, which can be difficult to obtain. Furthermore, training an end-to-end machine learning model can be challenging and time-consuming as it can often contain thousands or even millions of parameters (e.g., learned weights and biases) calculated through a trial-and-error process (e.g., back propagation)—earning end-to-end machine learning models the nickname "black box models."

For these reasons, improved machine control and improved image processing models for object detection and classification are highly desired.

SUMMARY

In some situations, a machine relies on image processing models to detect one or more objects (or object types) to be operated on (e.g., the type of clothes for washing machines, and the type of food items for microwave ovens), and automatically selects a machine operational setting based on the detected one or more objects (or object types).

As stated in the background, end-to-end machine learning models such as convolutional neural networks (CNNs) and their variations are powerful image processing models, and are widely used for object detection tasks. However, end-to-end machine learning models often require a large amount of data for training, and are difficult and time-consuming to train and troubleshoot due to the large number of model parameters calculated through a trial-and-error process. On the other hand, a traditional model (e.g., a non-end-to-end, handcrafted model) involves developing heuristics (e.g., by engineers) to extract a list of pre-defined features (e.g., manually selected and defined local features) from the input data (e.g., an input image), and predicting object types based on the extracted features. Compared to end-to-end machine learning models, traditional models require less or no training data and are easier to troubleshoot. However, developing a traditional model requires special engineering knowledge and expertise in defining the local features and devising customized heuristics to extract the defined features for object detection.

For object detection tasks, global features describe an image as a whole and represent the entire image as a single vector. Local features, on the other hand, are descriptors of local image characteristics. Image processing models built on local features, compared to those built on global features (e.g., end-to-end models), are generally better at detecting cluttered and/or occluded objects. For example, on images where clear segmentation of objects of interest are not available (e.g., an image of deformable laundry items loaded into a washing machine), image processing models built on local features can perform significantly better than those based on global features. FIGS. 3, 4, and the related description describe the training and inference of an image processing model built on local features.

For these reasons, improved methods and systems for developing an image processing model based on local features with a hybrid of deep learning and traditional handcraft methods, applying the image processing model to detect and classify an object, and automatically selecting a machine operational setting based on the detected and classified objects, are highly desired.

The present disclosure describes a system and method for controlling a machine (e.g., a laundry machine). In some embodiments, at a first machine (e.g., laundry machine) having one or more processors, a camera, and memory: the first machine (e.g., the laundry machine) captures one or more images of an unorganized collection of items (e.g., laundry) inside the first machine (e.g., the laundry machine). The first machine (e.g., the laundry machine) determines one or more item types of the unorganized collection of items (e.g., clothes types of the laundry) from the one or more images, comprising: dividing a respective image in the one or more images into a respective plurality of sub-regions; performing feature detection on the respective plurality of sub-regions of the respective image to obtain a respective plurality of regional feature vectors, wherein a regional feature vector for a sub-region indicates characteristics for a plurality of predefined local item features (e.g., local clothes features) for the sub-region; and generating an integrated feature vector for the respective image by combining the respective plurality of regional feature vectors; and applying a plurality of binary classifiers to the integrated feature vector for the respective image, wherein a respective binary classifier of the plurality of binary classifiers is configured to receive the integrated feature vector and determine if an item type (e.g., a clothes type) associated with the binary classifier exists in the respective image based on the integrated feature vector for the respective image. The first machine (e.g., the laundry machine) selects a machine setting for the first machine (e.g., the laundry machine) based on the determined one or more item types in the unorganized collection of items (e.g., clothes types in the laundry).

In some embodiments, the first machine (e.g., the laundry machine) shifts the unorganized collection of items inside the first machine (e.g., the laundry inside the laundry machine) after capturing a respective one of the one or more images.

In some embodiments, the predefined item features (e.g., clothes features) include a plurality of manually identified item feature labels (e.g., clothes feature labels), and performing feature detection on the respective plurality of sub-regions to obtain the respective plurality of regional feature vectors include obtaining respective machine generated latent features corresponding to the plurality of manually identified item feature labels (e.g., clothes feature labels) through a machine learning model.

In some embodiments, the binary classifier is a support vector machine, and wherein the support vector machine is trained on feature vectors of the plurality of sub-regions generated by a deep learning model. In some embodiments, the feature vector is obtained from a layer of the deep learning model other than the output layer of the deep learning model. In some embodiments, the deep learning model was generated in a training process including: receiving a set of training data; dividing the set of training data into a plurality of subsets, each subset corresponding one or more of the plurality of predefined local item features (e.g., local clothes features) and having corresponding one or more item feature labels (e.g., clothes feature labels); and training the deep learning model using the set of training data with corresponding item feature labels (e.g., clothes feature labels).

Based on the methods and systems described herein, various issues associated with using image processing models to detect and classify objects that are prone to misclassification are addressed.

In one aspect, in accordance with some embodiments, a method is performed by a computing system that is communicably coupled with a home appliance and that is configured to control one or more functions of the home appliance.

In accordance with some embodiments, a computing system includes processors and memory storing instructions that, when executed, cause the one or more processors to perform the methods described herein. In accordance with some embodiments, an electronic device includes one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device, cause the device to perform or cause the performance of the operations of any of the methods described herein. In accordance with some embodiments, an electronic device includes: means for capturing images, and means for performing or causing the performance of the operations of any of the methods described herein.

Various additional advantages of the present application are apparent in light of the description below.

BRIEF DESCRIPTION OF THE DRAWINGS

The aforementioned features and advantages of the disclosed technology, as well as additional features and advantages thereof, will be more clearly understood hereinafter as a result of a detailed description of preferred embodiments when taken in conjunction with the drawings.

To describe the technical solutions in the embodiments of the presently disclosed technology or in the prior art more clearly, the following briefly introduces the accompanying drawings required for describing the embodiments or the prior art. Apparently, the accompanying drawings in the following description show merely some embodiments of the presently disclosed technology, and persons of ordinary skill in the art may still derive other drawings from these accompanying drawings without creative efforts.

FIG. 6 is a flowchart diagram of a method for performing an automated machine setting selection based on image detection and classification results produced through local feature extraction, in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application.

Figure 1A:
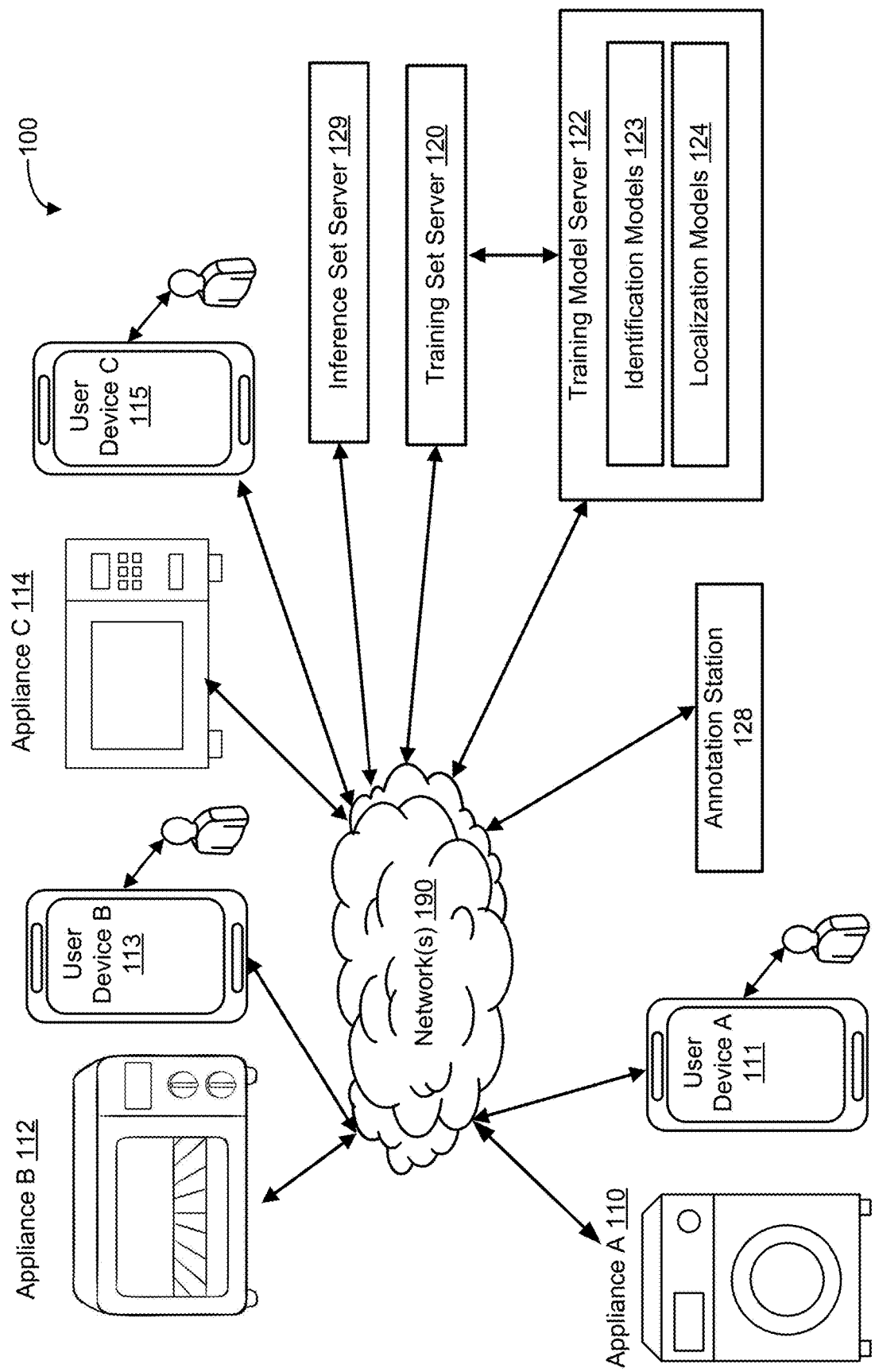
FIG. 1A shows a block diagram of an operation environment of a home appliance system, in accordance with some embodiments.

FIG. 1A shows a block diagram of an operation environment 100 of a home appliance system in accordance with some embodiments.

The operation environment 100 of a home appliance system includes one or more home appliances (e.g., appliance A 110, appliance B 112, and appliance C 114), connected to one or more servers (e.g., training set server 120 and training model server 122), and optionally to one or more user devices (e.g., user device A 111, user device B 113, and user device C 115) and/or annotation station(s) 128, via network 190 (e.g., a wide area network such as the Internet, or a local area network such as a smart home network).

In some embodiments the one or more home appliances (e.g., smart washing machines, smart microwave ovens, etc.) are configured to collect raw sensor data (e.g., image, weight, temperature, thermal map data, etc.) and send the raw sensor data to corresponding user devices (e.g., smart phones, tablet devices, etc.), annotation station 128 (e.g., workstations and desktop computers), and/or training set server 120 (e.g., server provided by the manufacturer of the home appliances or third-party service providers for the manufacturer). In some embodiments, the one or more home appliances are also configured to receive control instructions from training model server 122 and/or a corresponding user device (e.g., appliance C 114 may receive control instructions from training model server 122 to set the microwave oven temperature to 425° F. for roasting vegetables and appliance A 110 may receive control instructions from user device A 111 to select a washer cycle). Additional details regarding the one or more home appliances (e.g., appliance A 110, appliance B 112, and appliance C 114) is described in detail with reference to other parts of the present disclosure.

In some embodiments, the one or more user devices are configured to receive raw sensor data from a respective appliance (e.g., user device A 111, which corresponds to appliance A 110, is configured to receive raw sensor data from appliance A 110). In some embodiments, the one or more user devices are also configured to send annotated data to annotation station 128 and/or training set server 120. In some embodiments, the one or more user devices are configured to generate and send control instructions to the respective appliance (e.g., user device A 111 may send instructions to appliance A 110 to turn appliance A 110 on/off or to select a setting on appliance A 110). In some embodiments, the one or more user devices include, but is not limited to, a mobile phone, a tablet, or a computer device. In some embodiments, one or more user devices may correspond to one appliance (e.g., a computer and a mobile phone may both correspond to appliance A 110 (e.g., both are registered to be a control device for appliance A in an appliance setup process) such that appliance A 110 may send raw sensor data to either or both the computer and the mobile phone). In some embodiments, a user device corresponds to (e.g., shares data with and/or is in communication with) an appliance (e.g., user device A 111 corresponds to appliance A 110). For example, appliance A 110 may collect data (e.g., raw sensor data, such as images or temperature data) and send the collected data to user device A 111 so that the collected data may be annotated by a user on user device A 111.

In some embodiments, annotation station 128 is configured to receive collected data from the one or more appliances (e.g. appliances 110, 112, and 114) so that the collected data may be annotated by specialized annotation personnel. In some embodiments, annotation station 128 is configured to receive annotated data from the one or more user devices (e.g., user devices 111, 113, and 115) for review, editing, and/or approval by the specialized annotation personnel. In some embodiments, when annotated data from the one or more user devices have been approved at annotation station 128, annotation station sends the approved data to training set server 120 to be included in the training corpus stored at the training set server. In some embodiments, annotation station 128 retrieves annotated data from server 120 for review, editing, and/or approval by the specialized annotation personnel. In some embodiments, annotation station 128 retrieves unannotated data from server 120 for annotation by the specialized annotation personnel. Sensor data that has been annotated and/or approved at annotation station 128 is returned to server 120 for inclusion in the training corpus.

In some embodiments, training set server 120 is configured to receive raw sensor data from the one or more home appliances (e.g. appliances 110, 112, and 114), and/or receive annotated data from the one or more user devices (e.g., user devices 111, 113, and 115). In some embodiments, training set server 120 is also configured to send raw and/or annotated data to annotation station 128, and receive annotated and/or approved annotated data from annotation station 128. Training set server 120 is configured to preprocess the annotated data, e.g., to group, divide, and correlate the training data, and index and store the training data, in accordance with the training models and training methods employed by training model server 122. Training set server 120 is configured to send selected training data (e.g., data that includes, corresponds to, or is based on annotated data that has been approved at annotation station 128) to training model server 122, in accordance with the particular training model requesting the training data.

In some embodiments, training model server 122 is configured to receive training data from training set server 120. Training model server is also optionally configured to send control instructions (e.g., machine instructions prepared according to the control protocols of a particular home appliance) and/or send text data (e.g., text messages) to the one or more appliances and/or user devices. Training model server 122 includes identification models 123 (e.g., for identifying and classifying objects), localization models 124 (e.g., for localizing and outlining objects), and other models. Identification models 123 are related to identifying objects being operated on by a home appliance (e.g., clothes, food items, etc.). Localization models 124 are related to locating items in a home appliance. For example, localization models 124 may be used to identify two pieces of chicken on a left side of the oven rack of the smart oven and four cookies on the right side of the oven rack of the smart oven, and outline each of them in an image captured by the smart oven. Training model server 122 trains identification model 123, localization models 124 and/or other models based on training data received from training set server 120. Once the training of identification models 123, localization models 124 and other models are sufficiently completed (e.g., achieved a threshold level of accuracies), the training set server 120 receives requests from home appliances to determine item identity/location in real-time based on sensor data captured by the home appliances. In some embodiments, the condition of the items determined by the training set server 120 is provided back to the requesting home appliances, such that each home appliance determines an appropriate action, e.g., changing an operation of the home appliance and/or alerting a user, based on the determined condition of the item.

In some embodiments, home appliances (e.g. appliances 110, 112, and 114), user devices (e.g., user devices 111, 113, and 115), annotation station 128, training set server 120, and training model server 122 are connected (e.g., sharing data with and/or in communication with) through one or more networks 190. One or more networks 190 may include wired and wireless networks and may be a local area network of a home or a wide area network (e.g., Internet).

Figure 1B:
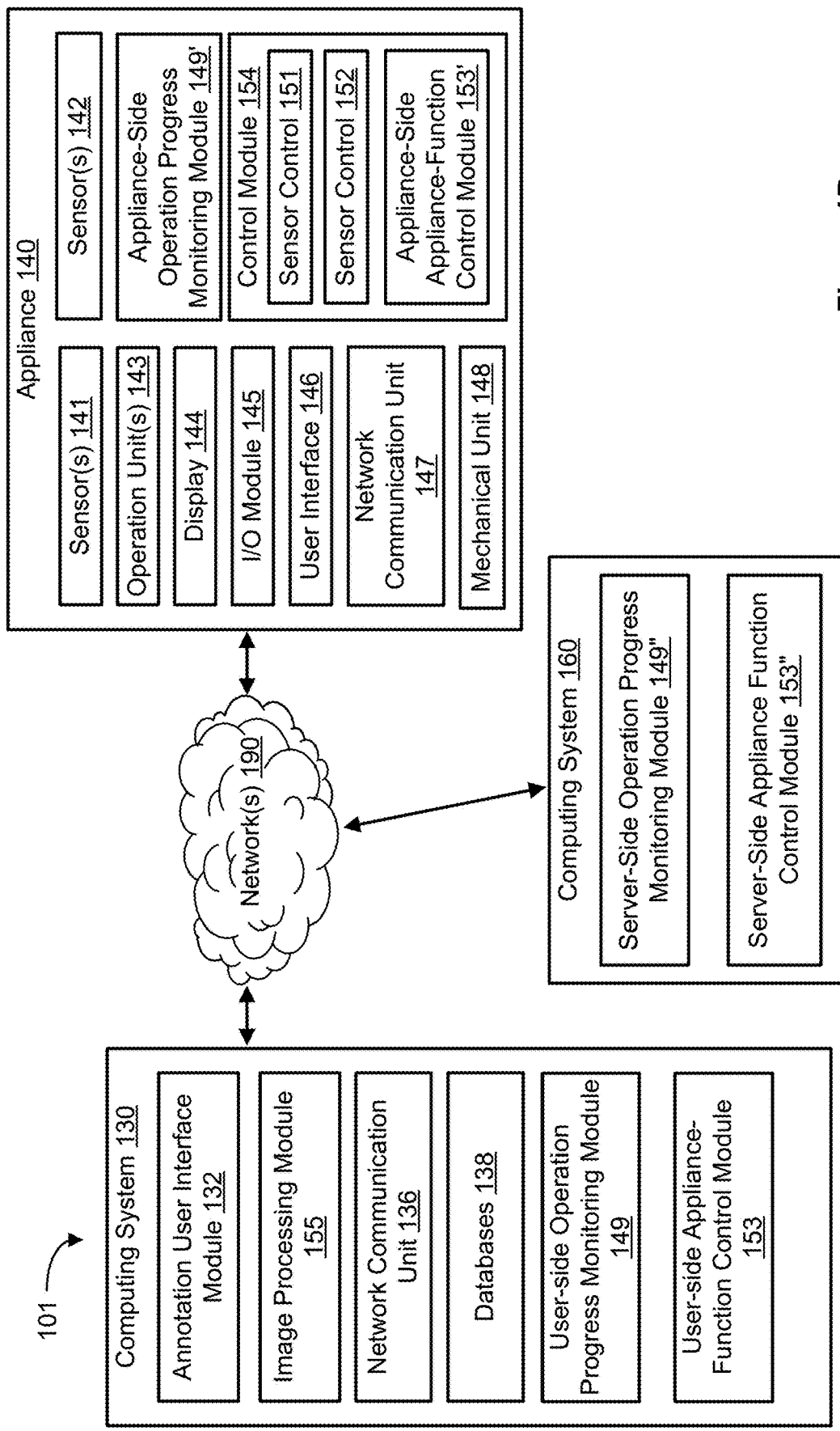
FIGS. 1B-1C show block diagrams of a home appliance system, in accordance with some embodiments.

FIG. 1B show block diagrams of a home appliance system 101 in accordance with some embodiments.

In some embodiments, as shown in FIG. 1B, home appliance system 101 includes home appliance 140 and computing system 130 that is implemented separately from home appliance 140. Home appliance 140 can serve as any of home appliances 110, 112, and 114 in FIG. 1A. In some embodiments, computing system 130 is in communication with home appliance 140 through one or more networks 190. In some embodiments, computing system 130 is implemented on a user device (e.g., in association with a user application for controlling and interacting with the home appliance). In some embodiments, computing system 130 and appliance 140 further communicate with computing system 160 to accomplish some of the functions on computing system 130 and appliance 140 in accordance with a client-server configuration. In some embodiments, computing system 160 is implemented on a server of a manufacturer of the home appliance (e.g., on training model server 122). In some embodiments, computing system 160 is implemented on a standalone computer (e.g., on a local server of a smart home).

Referring to FIG. 1B, computing system 130 includes one or more of annotation user interface module 132, imaging processing module 134, network communication unit 136, and one or more databases 138. which corresponds to user devices as described above with respect to FIG. 1A (e.g., user devices 111, 113, and 115). In some embodiments, computing system 130 further includes user-side operation progress monitoring module 149 and user-side appliance-function control module 153 to facilitate the machine operation progress monitoring and appliance control aspects of the home appliance system, in addition to the data collection and annotation aspect of the home appliance system as described herein.

In some embodiments, annotation user interface module 132 allows a user of computing system 130 to view and annotate raw sensor data received from a corresponding appliance 140 (e.g., appliance 110, 112, or 114). For example, a user may use an application on their user device (e.g., user device 111, 113, or 115) to view images and temperature data recorded by a corresponding appliance. The user may be able to add annotations and details to the collected data, in accordance with some embodiments.

In some embodiments, image processing module 155 obtains images captured by imaging system of appliance 140 and processes the images for analysis. The functions of image processing module 154 and imaging system of appliance 140 are described below with respect to 3, for example.

Network communication unit 136 allows computing system 130 to communicate with appliance 140 and/or computing system 160 over one or more networks 190.

In some embodiments, databases 138 include a database of previously captured images of objects or images from other similar home appliance systems. In some embodiments, databases 138 includes ingredient databases that allow the computing system to provide nutritional information and recipes to the user, or clothes databases that allow the computing system to provide washing instructions to the user.

In some embodiments, computing system 130 includes an application that provides user-side functions, such as user-side operation progress monitoring and appliance-function control, in conjunction with computing system 160 and appliance 140.

In some embodiments, user-side progress monitoring module 149 is configured to determine progress of machine operation based on real-time sensor data captured by appliance 140.

In some embodiments, user-side appliance-function control module 153 is configured to provide a user interface for the user to directly control the appliance functions (e.g., turning the appliance on/off or setting an appliance parameter, etc.), and/or automatically generate control instructions based on the result of the progress monitoring. In some embodiments, the result of the progress monitoring is provided to the user-side appliance-function control module 153 from the user-side progress monitoring module 149. In some embodiments, the result of the progress monitoring is provided to the user-side appliance-function control module 153 from computing system 160. In some embodiments, the result of the progress monitoring is provided to the user-side appliance-function control module 153 from appliance 140.

In some embodiments, appliance 140 includes one or more first sensors (e.g., sensors 141), one or more heating units 143, display 144, I/O module 145, user interface 145, network communication unit 147, mechanical unit 148, control module 155, imaging system, and, optionally, appliance-side operation progress monitoring module 149'. Control module 155 includes an optional appliance-side appliance-function control unit 153'.

In some embodiments, the one or more first sensors 141 are configured to capture structured data, such as temperature, weight, and/or humidity. Structured data, as discussed herein, refers to quantitative or state data such as temperature, humidity, time, on/off, oven mode, etc. For example, the one or more first sensors 212 may be a temperature sensor (e.g., thermometer) or a humidity sensor, or weight sensor of the home appliance 140.

In some embodiments, the one or more operation units 143 (e.g., heating elements, turning elements, fan, etc.) are configured to heat at least a portion of the of the appliance (e.g., a heating coil configured to heat a cooking chamber of a smart oven, a heating element for heating the air going into a dryer, a heating element for heating the water that goes into the washing tub of a washing machine, etc.).

In some embodiments, appliance 140 includes a display 144 that can provide information about appliance 140 to a user (e.g., the currently selected washer cycle). In some embodiments, display 144 may be integrated with I/O module 145 and user interface 146 to allow the user to input information into or read out information from appliance 140. In some embodiments, display 144 in conjunction with I/O module 145 and user interface 146 provides recommendations, alerts and nutritional information to the user and receive control instructions from the user (e.g., via hardware and/or software interfaces provided by appliance 140). In some embodiments, display 144 may be a touch screen display or a display that includes buttons. In some embodiments, display 144 may be a simple display with no touch-screen features (such as a conventional LED or LCD display) and user interface 146 may be hardware buttons or knobs that can be manually controlled. In some embodiments, user interface 146 optionally includes one or more of the following a display, a speaker, a keyboard, a touch-screen, a voice input-output interface etc.

Network communication unit 147 is analogous in function to network communication unit 137. Network communication unit 147 allows appliance 140 to communicate with computing system 130 and/or computing system 160 over one or more networks 190.

Mechanical unit 148 described herein refers to hardware and corresponding software and firmware components of appliance 140 that are configured to physically change the internal sensing (e.g., imaging), heating and/or layout configuration of the home appliance 140. For example, the one or more first sensors 141 may correspond to a mechanical unit such that the one or more sensors 141 are movable to scan a respective area inside appliance 140 (e.g., a motor may be configured to move a sensor across a predetermined area in order to capture data across the predetermined area). In some embodiments, the mechanical units 148 of the appliance 140 are operated in accordance with instructions from the appliance-function control unit of the home appliance system (e.g., appliance-side appliance-function control module 153', user-side appliance-function control module 153, and/or server-side appliance-function control module 153").

In some embodiments, appliance-side operation progress monitoring module 149' is configured to monitor operation progress of appliance 140. For example, if the appliance is a smart oven, appliance-side operation progress monitoring module 149' may, based on raw data recorded by the one or more first sensors 212 and/or the one or more second sensors 214, determine that the food has been cooked to medium doneness. In some embodiments, appliance-side operation progress monitoring module 149' is configured to determine cooking progress of food items based on real-time sensor data captured by sensors 141 and imaging system using food item location and outline determination models and food cooking progress level determination models that have been trained on computing system 160.

In some embodiments, imaging system includes one or more second sensors 142. The one or more second sensors 142 are configured to capture unstructured data. Examples of unstructured data include RGB images and thermal or infrared images. For example, if the appliance is a washing machine or dryer, after the door of the washing machine or dryer is closed and before a washing machine or a dryer enters into a normal operation (e.g., starting a washing or drying cycle), the washing machine or dryer triggers the cameras on the washing machine or dryer door to capture a sequence of images of the inside of the washing machine or dryer tub. In some embodiments, the washing machine or dryer causes its drum to turn one or more times to tumble the clothes inside in order to capture images of the clothing items from different angles. In some embodiments, the washing machine or dryer includes multiple flashlights at different locations and illuminates the clothing items from different directions each time an image is captured. For example, if the appliance is a smart oven, the one or more second sensors 142 may be configured to capture or record still images or videos of the food present in a cooking compartment of an appliance. In some embodiments, if the appliance is a smart oven, imaging system includes a data storage system that stores the dimensions of the food cooking compartment, and the dimensions of the reference markers within the food cooking compartment, the distances between the camera and the various reference markers within the food cooking compartment, such that images taken by the cameras can be used to accurately determine the size and shape of the food items within the images. Thus, the imaging system eliminates the problems with conventional imaging systems which require the user's special attention to place a reference marker within the images or use images without the benefit of the size and location and orientation information of the items within the images. In some embodiments, the imaging system includes an image capture triggering system. For example, in some embodiments, the image capturing is triggered when the image capture triggering system detects that there has been a change in the field of view of the camera. For example, when the oven door is opened, the lighting condition in the oven will be changed, and the image capturing will be triggered in response to the opening of the oven door. In some embodiments, the image capturing is triggered when the food item starts to appear in the field of view of the camera. In some embodiments, the image capturing is triggered when then food item is completely inserted and the oven door is closed. In some embodiments, the image capture trigger system also instructs the camera to capture and store an image of the oven rack immediately before the oven door is opened, as the compartment baseline image of the interior of the oven. In some embodiments, the image capturing is triggered manually in response to a user's input, for example, after the user has inserted the food item into the food cooking compartment. Manual trigger is easier and less complicated to implement, and allows the user to purposefully capture images that best reflect the characteristics of the food item for ingredient recognition. In some embodiments, image processing module 154 obtains the images captured by the one or more second sensors 142, and preprocesses the images to remove the background from the images based on the compartment baseline image captured before the insertion of the food item. The compartment baseline image captures the exact condition of the food support platform in the food cooking compartment of the home appliance system, and provides an excellent filter for the images containing the food item to remove the background.

In some embodiments, control module 155 includes sensor control 151, sensor control 152, and appliance-side appliance-function control module 153'. Sensor control 151 is configured to control and adjust the one or more first sensors 141. For example, sensor control 151 may send instructions for the one or more first sensors 141 to record temperature data at 1-minute intervals. Sensor control 152 is configured to control and adjust the one or more second sensors 142. For example, sensor control 152 may send instructions for the one or more second sensors 142 to be moved along a first direction and to take capture a picture when the one or more second sensors 142 are at the starting position before being moved and at the final position after being moved.

Appliance-side appliance-function control module 153' is configured to control and adjust the various functions of appliance 140. For example, appliance-side appliance-function control module 153' may send instructions to heating units 143 to activate a first heating unit of the one or more heating units, or may send instructions to mechanical unit 148 to change its position. In some embodiments, appliance-side appliance-function control module 153' generates and send control instructions to various components of the appliance 140 based on preconfigured operation protocols (e.g., to implement the normal routine functions of the appliance 140). In some embodiments, appliance-side appliance-function control module 153' generates and send control instructions to various components of the appliance 140 based on real-time operation progress monitoring within the home appliance (e.g., to adjust functions of the appliance 140 automatically without user intervention based on preset reactions protocols or programs). In some embodiments, appliance-side appliance-function control module 153' generates and send control instructions to various components of the appliance 140 based on real-time user instructions received from user devices or via user interface 146 of appliance 140. In some embodiments, the result of the operation progress monitoring is provided to the appliance-side appliance-function control module 153' from the user-side operation progress monitoring module 149. In some embodiments, the result of the operation progress monitoring is provided to the appliance-side appliance-function control module 153' from computing system 160. In some embodiments, the result of the operation progress monitoring is provided to the appliance-side appliance-function control module 153' from appliance-side operation progress monitoring module 149'.

In some embodiments, computing system 160 includes server-side operation progress monitoring module 149" and server-side appliance-function control module 153". In some embodiments, the server-side operation progress monitoring module 149" employs identification models 123, localization models 124 and other models shown in FIG. 1A to determine object identity, location, outlines, and other conditions from real-time sensor data received from home appliance 140 (e.g., directly or through computing system 130). In some embodiments, computing system 160 is implemented by training model server 122 in FIG. 1A, for example.

The functions of various systems within home appliance system 101 in FIG. 1B are merely illustrative. Other configurations and divisions of the functionalities are possible. Some functions of one sub-system can be implemented on another sub-system in various embodiments.

Figure 1C:
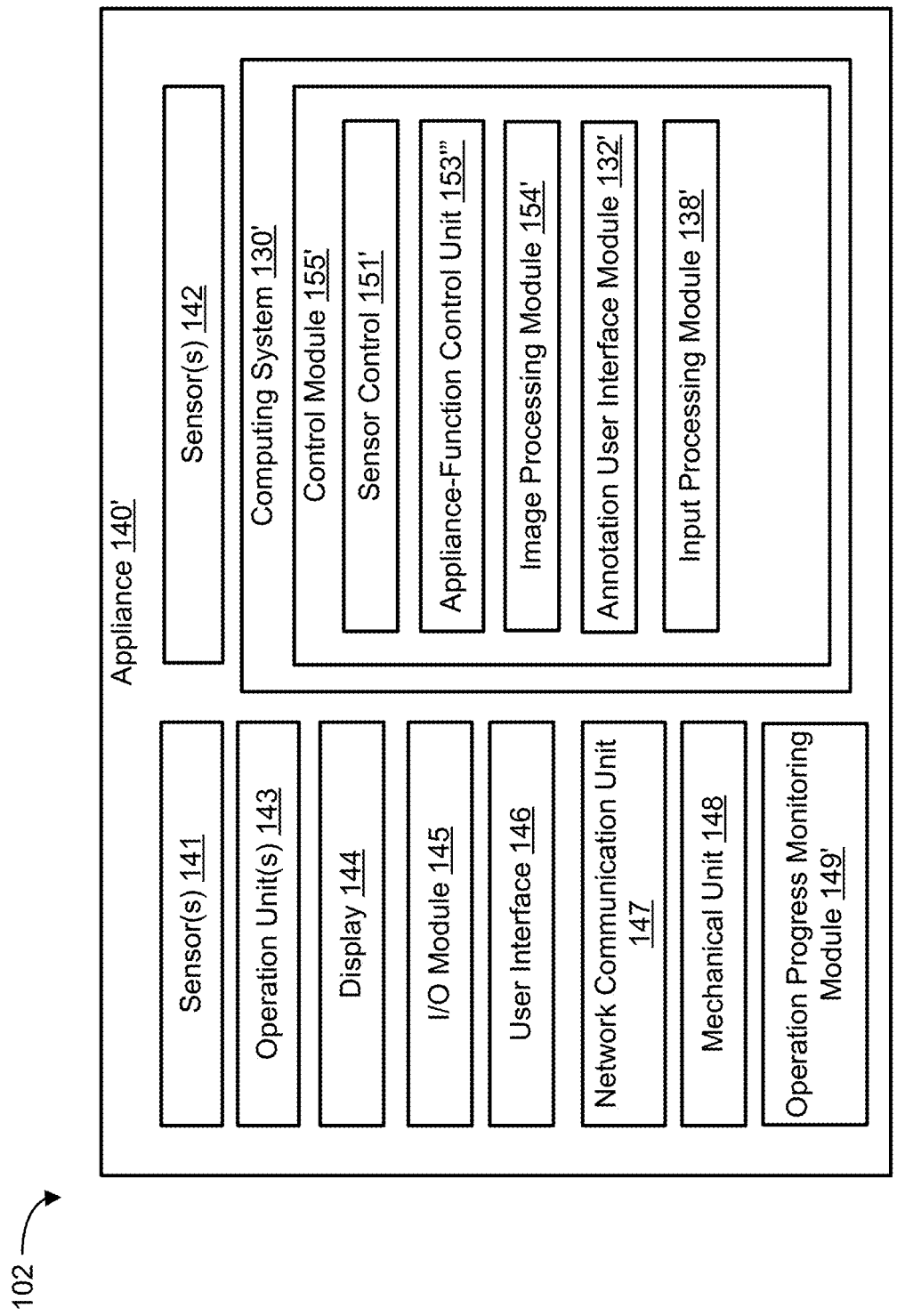

In some embodiments, as shown in FIG. 1C, home appliance system 101 includes a computing system 130' that is integrated with appliance 140'. In some embodiments, computing system 130' communicates with computing system 160' to accomplish some of the functions of appliance 140'. In some embodiments, appliance 140' optionally communicates with computing system 160 to outsource some of the functions of appliance 140'.

Referring to FIG. 1C, appliance 140' has a built-in computing system 130'. Appliance 140' includes sensors 141, heating unit(s) 143, display 144, I/O module 145, user interface 146, network communication unit 147, mechanical unit 148, and imaging system. These components of appliance 140' correspond to those in appliance 140 and have similar functionalities that will not be repeated herein for brevity.

In some embodiments, computing system 130' within appliance 140' includes control unit 155', sensor control 151', sensor control 152', appliance-side operation progress monitoring system 149', appliance-side appliance-function control module 153', image processing system 154', databases 138', and appliance-side annotation user interface module 132'. The functions of these components correspond to their respective counterparts with the same names in appliance 140 (e.g., sensor control 151' has the same function as sensor control 151) and will not be repeated for brevity. In some embodiments, annotation user interface module 132''' may allow a user to view and annotate raw user data on a user device, separate from appliance 140. In comparison, appliance-side annotation user interface module 132' may allow a user to view and annotate raw user data on display 144 of appliance 140' and/or annotate the operation progress levels in the images with voice input.

The above examples are provided merely for illustrative purposes. More details of the functions of the various components are set forth below with respect to other figures and illustrations. It can be understood that one or more components described herein may be used independently of other components.

Figure 2:
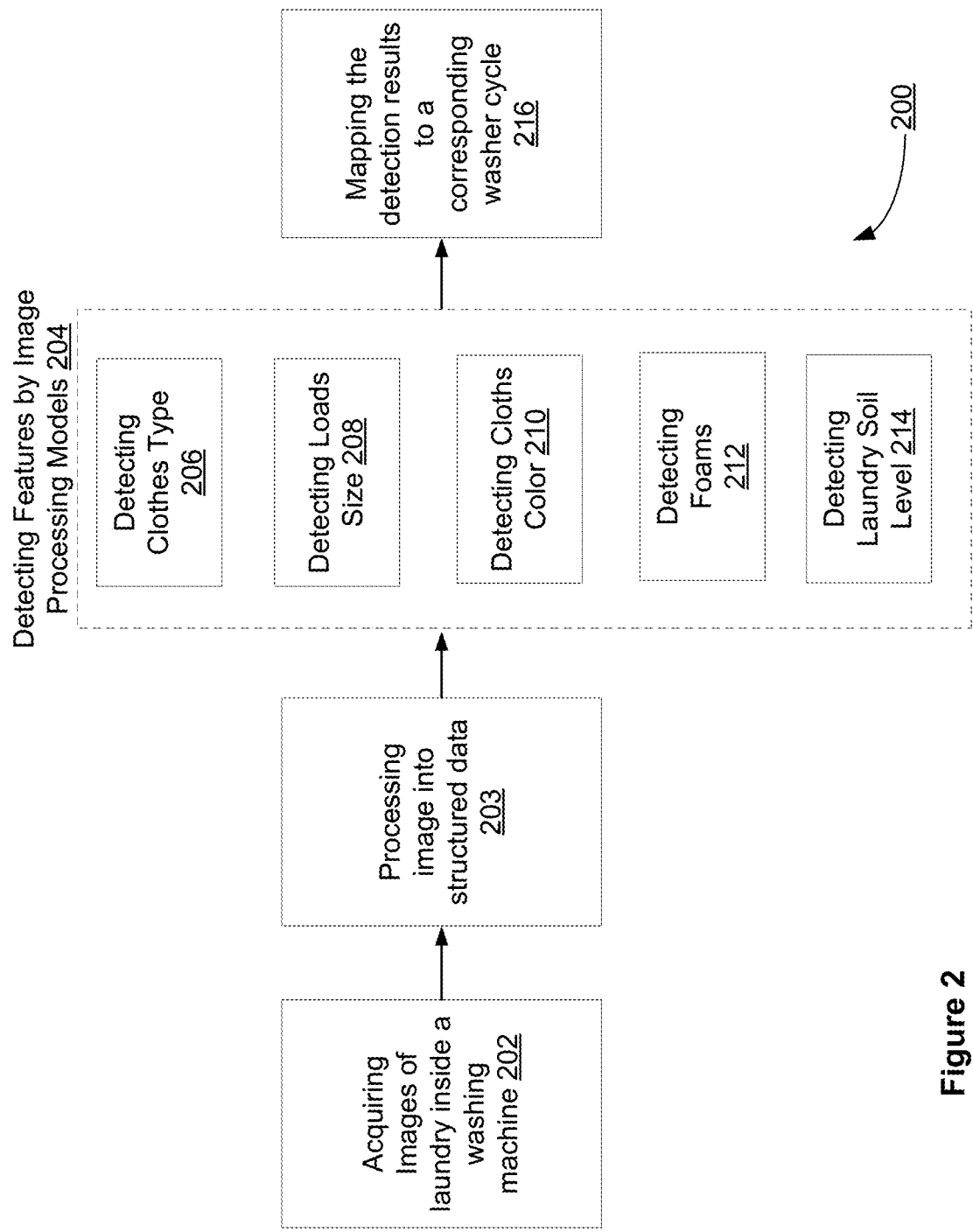
FIG. 2 is a schematic of a process for automatically selecting a washer cycle setting based on detected images of laundry loaded in a washing machine, in accordance with some embodiments.

FIG. 2 is a schematic of a process 200 for automatically selecting a washer cycle setting based on detected images of loaded laundry inside a washing machine, in accordance with some embodiments. For convenience, the process 200 is described as being performed by a computing system of a washing machine (e.g., the computing system 130' of the appliance 140' in FIG. 1C).

Instead of relying on a user's manual selection of a washer cycle setting, the computing system of the washing machine uses image detection and classification models to recognize clothes types, and automatically selects a suitable washer cycle setting. In some embodiments, the automatically selected washer cycle setting is based on detected characteristics of the loaded clothes (e.g., fabric texture, color, size, type, etc.), and is set to minimize damages (e.g., color fading, tearing, stretching, etc.) to clothes during washing. In some embodiments, the automatically selected washer cycle is set to prevent damages to the washing machine. For example, if the computing system detects clothes with metal parts such as metal zippers, the computing system may select a washer cycle with reduced tumbling to prevent the metal parts from scratching the drum of the washing machine. In some embodiments, the computing system allows a user to prioritize washing objectives (e.g., to prevent damage to clothes, to maximize cleaning results, to minimize washing time, etc.), and the computing system will automatically select a washer cycle according to the user's configuration. In some embodiments, the user can disable the automatic washer cycle setting selection and instead selects a washer cycle setting manually.

To automatically select a washer cycle, the computing system of the washing machine first acquires a plurality of images of laundry loaded inside the washing machine (202). In some embodiments, one or more cameras (e.g., the sensors(s) 141 or 142 of FIG. 1B) are installed in the washing machine with a field of view covering the drum of the washing machine. For example, the one or more cameras can be installed on a washing machine door or window. In some embodiments, to acquire more representative and complete pictures of the loaded laundry, the washing machine drum tumbles slightly (e.g., half a turn) between each image capturing session to spread out the loaded laundry. In some embodiments, the one or more cameras take a video of the load laundry while the washing machine drum tumbles. In some embodiments, prior to formally initiating the washing cycles based on a respective setting for the washing cycle, the computing system instructs the washing machine to start the rotation of the machine drum and takes a sequence of images of the clothes items within the machine drum, and use each of those images as input images for object detection and classification. The final inference results from multiple of these input images are obtained by combining the inference results from each of the input images. For example, in some embodiments, as long as the inference result from a single input image among the multiple images indicates a presence of a particular type of clothes items with the most restrictive setting requirements among the clothes items identified, the machine setting is modified based on the presence of that particular type of clothes items. In some embodiments, detecting of the particular type of clothes item in a threshold number of input images among the multiple input images are required to trigger the modification of the machine setting.

Once the one or more cameras finish taking images of the loaded laundry, the computing system sends the images to an image processing module (e.g., the image processing module 154' in FIG. 1C) for preprocessing (203). During preprocessing, unstructured image raw data is transformed before it is fed to the image processing models. The preprocessing can help improving training speed and classification accuracy. Exemplary preprocessing techniques include aspect ratio standardizing, image scaling, mean normalization, data normalization, dimension reduction, data augmentation, and so on.

Next, the preprocessed images are sent to one or more image processing models for feature detections (204). In some embodiments, the image processing models are stored and executed locally in the computing system of the washing machine. Alternatively, the image processing models are stored and executed in a remote server (e.g., the inference set server 129 of FIG. 1A) connected to the computing system of the washing machine via a network (e.g., the network(s) 190 in FIG. 1A). The image processing models can be updated continuously via the network throughout the work life of the washing machine.

In some embodiments, the image processing models receive the preprocessed laundry images as inputs, and output one or more detected features of the loaded laundry. The image processing models can include one or more image detection algorithms such as Convolutional Neural Network (CNN), Regional-based CNN (R-CNN), Fast and Faster R-CNN, Region-based Fully Convolutional Network (R-FCN), You-Only-Look-Once (YOLO), Single Shot Detector (SSD), and so on. Due to the high resource cost associated with training image processing models, in some embodiments, the image processing models are first trained in a remote computing system (e.g., the training model server 122 of FIG. 1A), and sent to the local computing system of the washing machine via a network update.

In some embodiments, each image processing model is configured to detect one type of feature. For example, a separate image processing model can be configured to detect clothes type (206), load size (208), clothes colors (210), foams (212), soil level (214), and so on. In some embodiments, the image processing models receive additional inputs from sensors installed in the washing machine for feature detection. For example, one or more weight scales can be installed in the washing machine to measure the load weight. In some embodiments, each image processing model is a bi-classification classifier. For example, an image processing model can be configured to determine whether an image contains "shirt" or not, or the image processing model can be configured to determine whether the image contains "red colored clothes" or not.

A problem associated with using image processing models to detect clothes types is that certain clothes types are prone to misclassification and consistently cause the image processing models to generate false positive results (or alternatively, false negative results). This may be due to the fact that cloths are often twisted and tangled in the drum, thus hiding their full features. For example, shirts that are tangled and twisted may look very similar to brassieres, and cause an image processing model to falsely determine that shirts are brassieres (false positives). To increase the precision of object detection and classification (e.g., reduce the number of false positive results) while maintaining the recall (e.g., do not increase the number of false negative results) by an image processing model, a modified machine learning training process is implemented on the training servers (e.g., the training model server 122 of FIG. 1A). The modified machine learning training process is described in detail with reference to FIG. 3.

After the image processing models detect and classify the loaded laundry, the computing system of the washing machine maps the detection results to corresponding washer cycles (216). Exemplary washer cycles include regular cycle (e.g., for cotton clothes), permanent press cycle (e.g., for colored clothes), delicate cycle (e.g., for fine-material clothes), and so on. Each cycle is associated with different water temperature, tumbling speed, spinning speed, and washing time.

The mapping from the detection results to corresponding washer cycles setting is preconfigured and can be later updated via a remote server (e.g., the computing system 130 of FIG. 1B). For example, the mapping may be configured to maximize one or more washing goals such as preserving the clothes life, reducing washing time, removing stain, and so on. The mapping can be based on the materials, texture, size, number, and color of the detected clothes. For example, if the computing system detects that the laundry load contains bright-colored clothes made of wool, a gentle washer cycle may be used.

FIG. 2 is an example of how a machine setting may be controlled in accordance with object detection and classification results from an image processing module based on local feature extractors and support vector machines, as described herein. Other types of machines, such a clothes dryer with different drying settings for different types of clothes items identified in an image of the dryer drum, an oven with different cooking settings for different types of food items identified in an image of the oven chamber, a dish washer with different washing settings for different types of dishes and containers that are in the dish rack, etc., are optionally controlled using the method described herein for various operations of the machines with variable settings, in accordance with some embodiments.

Figure 3:
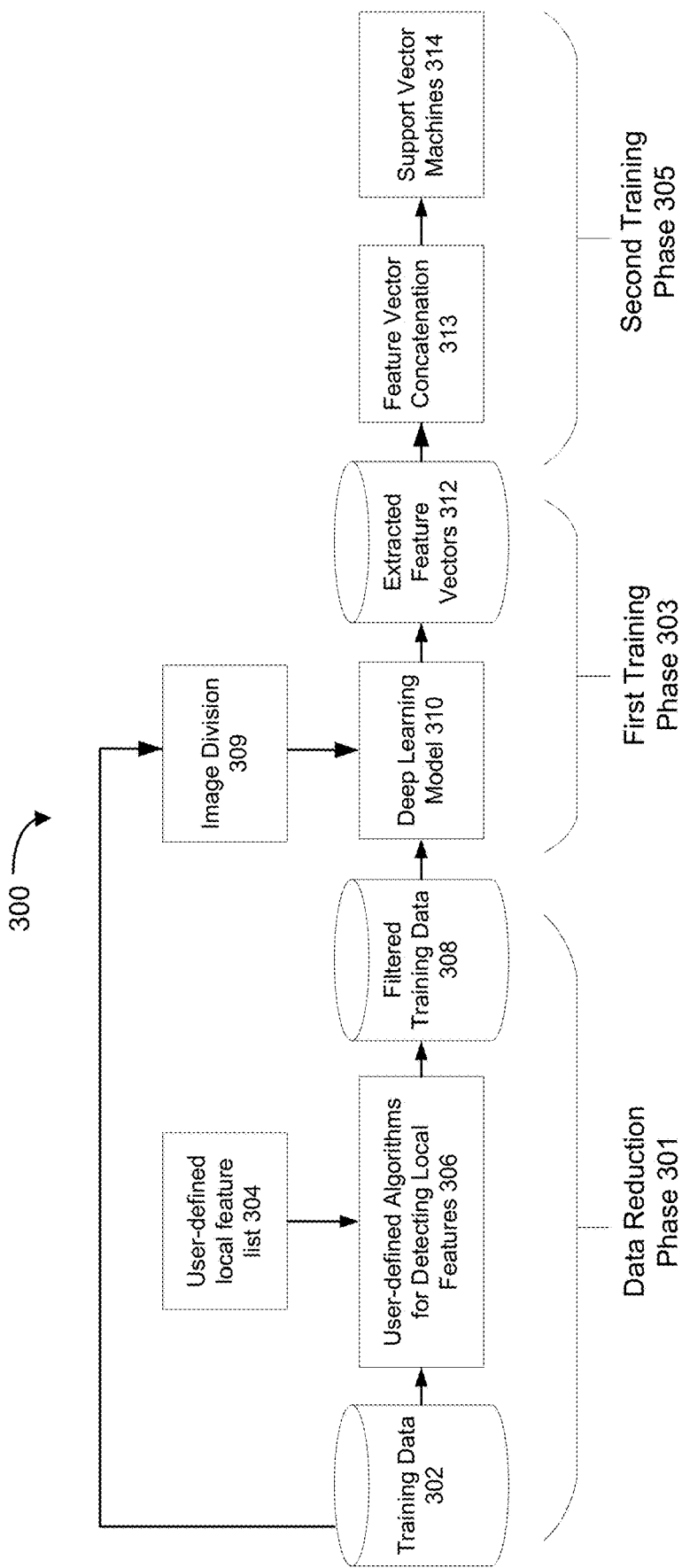
FIG. 3 is a schematic of a process for using a hybrid of deep learning method and traditional handcraft method to develop an image processing model with local feature extractors and support vector machines, in accordance with some embodiments.

FIG. 3 is a schematic of a process for using a hybrid of deep learning method and traditional handcraft method to develop an image processing model with local feature extractors and support vector machines, in accordance with some embodiments. The image processing model uses feature extractors to identify feature vectors of user-defined local features from an input image, and applies one or more support vector machines to the identified feature vectors to detect and classify objects. For convenience, the process 300 is described as being performed by a remote computing system (e.g., the training model server 122 of FIG. 1A). The process 300 outputs a trained image processing model to be stored and used by a local computing system (e.g., the computing system 130' of FIG. 1C). In an alternative embodiment, the process 300 is performed by a local computing system, and outputs a trained image processing model to be stored and used by the same local computing system. The process 300 is a generalized image processing model training process and is not specific to training image processing models for detecting clothes types as described in FIG. 2.

In some embodiments, the process 300 comprises three distinct phases for developing (e.g., training) the image processing model: (1) a data reduction phase 301, (2) a first training phase 303 for training a deep learning model 310 for local feature extraction, and (3) a second training phase 305 for training support vector machines 314 for object detection and classification.

Figure 4:
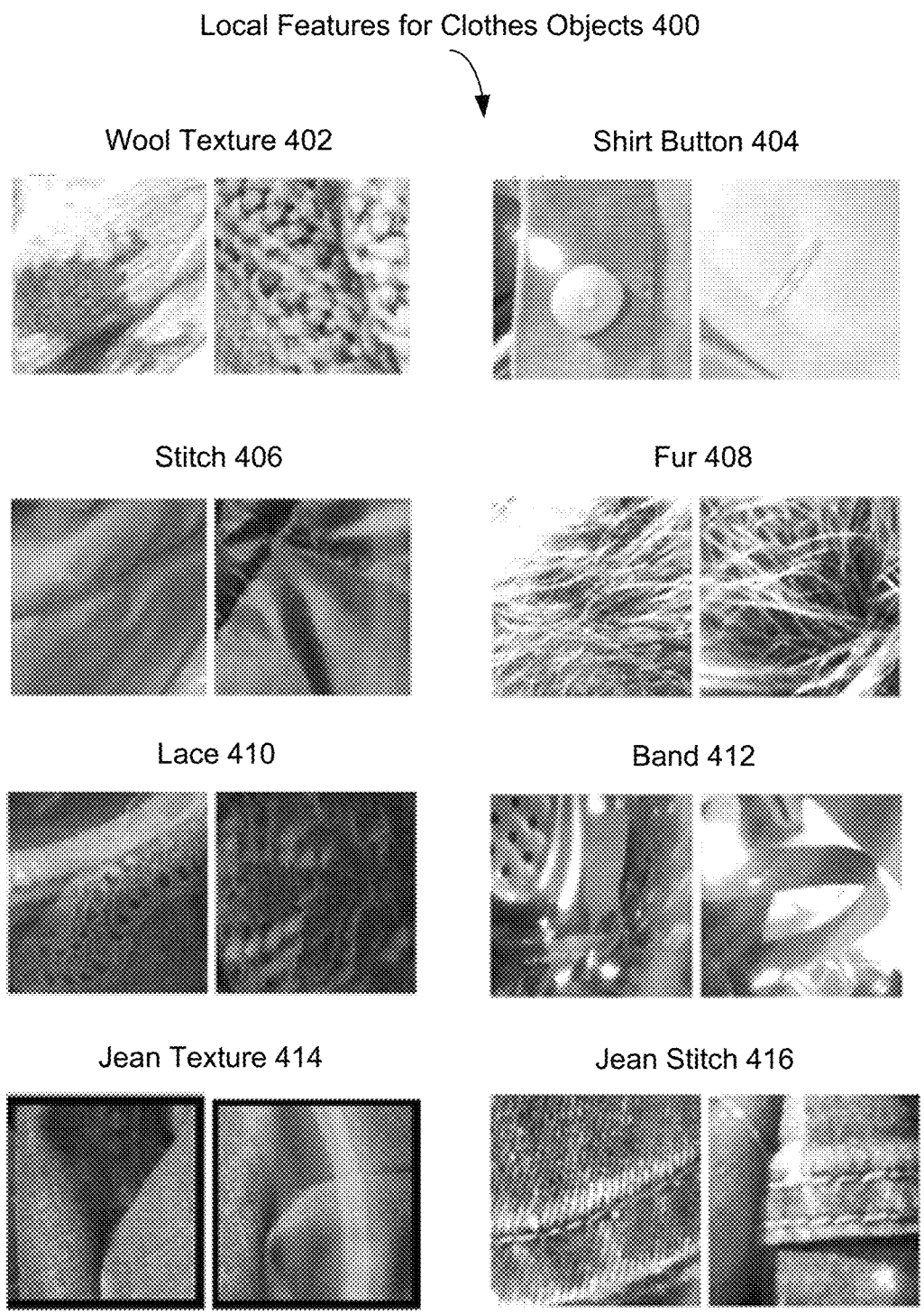
FIG. 4 illustrates exemplary local features for clothes items, in accordance with some embodiments.

In some embodiments, during the data reduction phase 301, the computing system filters a set of training data 302 to identify a subset of filtered training data 308 containing local features of interest (e.g., user-defined local features). For object detection tasks, a local feature represents a local characteristic (e.g., defined by a user) of an object. For example, for an image processing model configured to detect and classify clothes items, a user may define local features of clothes items based on cloth texture, stitch pattern, lace, buttons, or other clothes characteristics. Refer to FIG. 4 and the related description for examples of user-defined local features for an image processing model configured to detect and classify clothes items. The data reduction phase 301 improves training efficiency for the deep learning model 310 (e.g., local feature extractors) as the filtered training data 308 are more likely to contain local features compared to the initial training data 302. The data reduction phase 301 requires user's expertise and knowledge in defining the user features and algorithms for detecting local features, making it a traditional handcraft method.

In some embodiments, to perform the data reduction, the computing system receives a user-defined local feature list 304 and user-defined algorithms for detecting local features 306, and checks each data point (e.g., a labeled image) in training data 302 to determine if any of the user-defined local features exist on a data point. In some embodiments, the user-defined algorithms for detecting local features 306 comprise heuristics for checking one or more characteristics for local features. For example, the user-defined algorithms for detecting local features 306 can include heuristics for checking contour, shape, location, color, or other characteristics of objects on an image that are indicative of user-defined local features from the user-defined local feature list 304.

In some embodiments, to maintain an adequate amount of filtered training data 308 for training the deep learning model 310 (e.g., local feature extractors), the user-defined algorithms for detecting local features 306 are configured to be more likely to produce false positives results (e.g., incorrectly including data points that do not have local features in the filtered training data 308) then false negatives (e.g., incorrectly excluding data points that have local features out of the filtered training data 308). In some embodiments, the data reduction phase 301 can be performed manually (e.g., by the annotation station of FIG. 1A) instead of by the user-defined algorithms for detecting local features 306 and the user-defined local feature list 304.

The computing system next uses the filtered training data 308 in the first training phase 303 to train the deep learning model 310 to identify the user-defined local features. For example, the deep learning model 310 can be a model for object detection such as a CNN, ResNet, YOLO, SSD, and so on.

In some embodiments, after the deep learning model 310 has been trained using the filtered training data 308, the computing system feeds initial training data to the deep learning model 310 for local feature extraction. For example, the deep learning model 310 receives training data 302 (e.g., images) and outputs extracted feature vectors 312 indicative of the presence of absence of user-defined local features on training data 302. In some embodiments, the training data 302 include image data and the computing system first performs image division 309 to divide each image into a plurality of sub-images (e.g., image grids) before feeding the image data to the deep learning model 310. The deep learning model 310 performs feature extractions on each of the sub-image to generate a respective feature vector, and all feature vectors belonging to the same image are integrated during a feature vector concatenation 313 step to form an integrated feature vector, indicative of the presence or absence of all local features on an image.

Next, during the second training phase 305, the computing system uses the integrated feature vectors for each image to train one or more support vector machines (SVMs) 314. An SVM is a supervised learning model that performs bi-classification of data using regression analysis. For example, each of the support vector machines 314 can be used to predict whether an image includes a particular data type given the feature vector (e.g., the integrated feature vector) extracted from the image (e.g., by the deep learning model 310).

In the context of an image processing model configured to detect and classify clothes items, the training data 302 can include images of laundry captured from a washing machine. The user-defined local feature list 304 includes multiple local features that are part of a clothes item such as cloth texture, buttons, stitches, lace, collars, zips, and so on. The user-defined algorithms are heuristics that estimate whether one or more local features are present on an image, such as by checking the contour, color, contrast, and other image characteristics. A subset of the training data 302 that is deemed to have contained one or more local features (e.g., determined by user defined algorithms) is then used to train the deep learning model 310 to generate a corresponding feature vector for an image. The feature vectors (or integrated feature vectors) are fed to a plurality of support vector machines each configured to detect whether a particular type of clothes (e.g., jeans, shirts, dresses, and so on) is present given the input feature vector.

Figure 5:
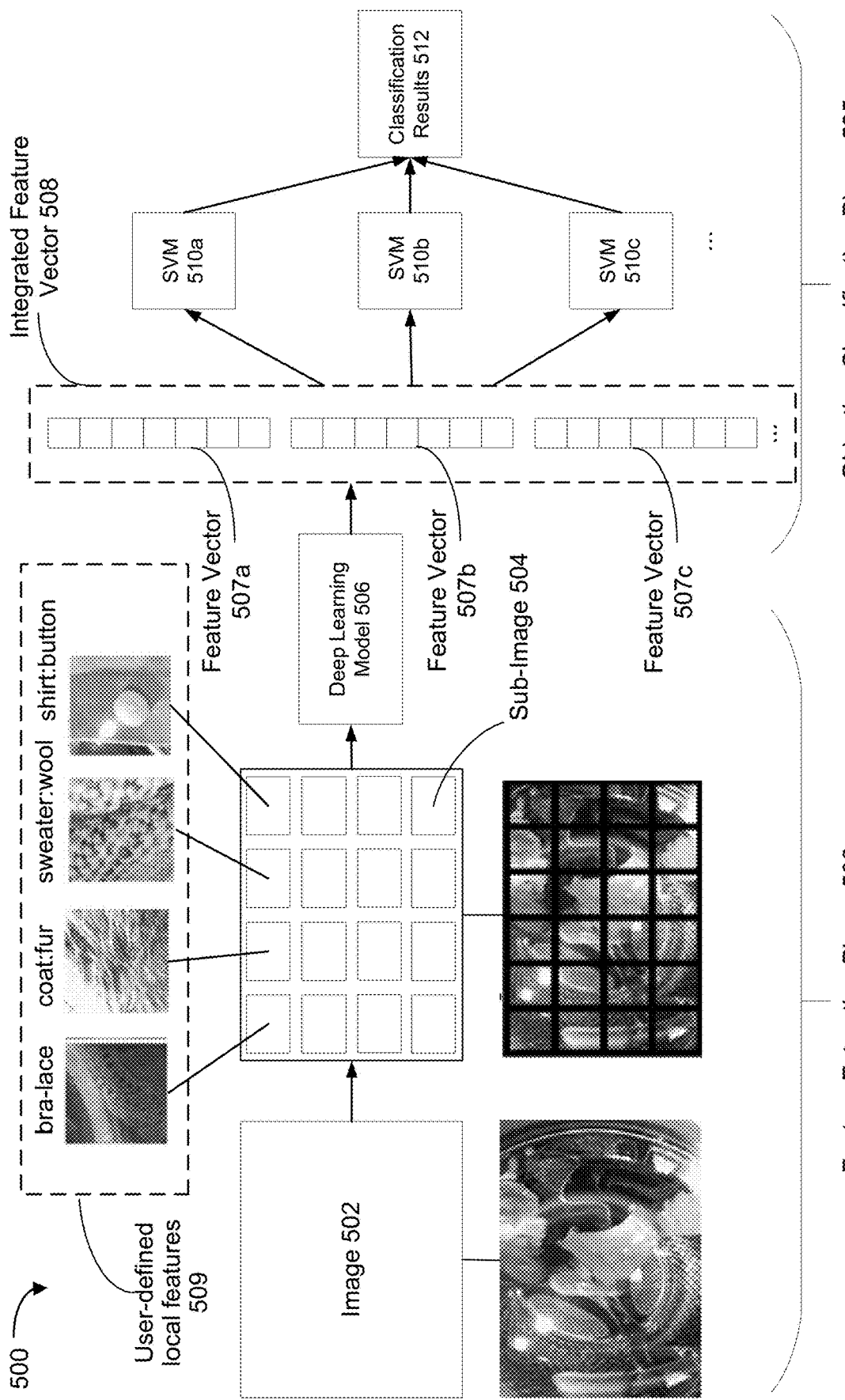
FIG. 5 is a schematic of a process for detecting and classifying objects using an image processing model with local feature extractors and support vector machines, in accordance with some embodiments.

FIG. 4 illustrates exemplary local features 400 for clothes items, in accordance with some embodiments. Local features capture regional characteristics of a clothes item, and can be used to detect and classify the clothes item. In some embodiments, using local features to detect and classify clothes types is more accurate than using global features (e.g., descriptor of the entire image), due to cluttering, occlusion, and/or deformation of clothes (e.g., in a washing machine). Refer to FIG. 5 and the related description for a process of using local features to predict clothes types. As illustrated in FIG. 4, examples of local features for clothes items include wool texture 402, shirt button 404, stitch 406, fur 408, lace 410, band 412, jean texture 414, jean stitch 416, and so on.

FIG. 5 is a schematic of a process 500 for detecting and classifying objects using an image processing model with local feature extractors and support vector machines, in accordance with some embodiments. In some embodiments, the objects are an unorganized collection of items inside a machine (e.g., clothes items loaded inside a washing machine, food ingredients in a smart oven or wok, food items inside of smart refrigerator, etc.). For convenience, the process 500 is described as being performed by a computing system (e.g., the computing system 130' of FIG. 1C) and is configured to detect and classify clothes items loaded inside a washing machine.

The process 500 comprises two distinct phases: (1) a feature extraction phase 503 and (2) an object classification phase 505. During the feature extraction phase 503, a deep learning model 506 receives an image 502 containing clothes items as an input and outputs feature vectors 507a-c indicative of local features on different parts of the image (e.g., sub-images). Next, during the object classification phase 505, the feature vectors 507a-c are concatenated to form an integrated feature vector 508, and a plurality of SVMs 510a-c each receives the integrated feature vector 508 as an input and outputs a respective object detection result.

In some embodiments, the image 502 is a greyscale or RGB image of a sequence of images taken from inside of a washing machine. The image 502 may contain clothes that are occulated and cluttered, and the sequence of images are taken while the washing machine's drum tumbles to spread out the clothes inside the drum. In some embodiments, the computing system performs one or more preprocessing steps such as removing color or resizing on the image 502 before passing the image 502 to the deep learning model 506.

In some embodiments, the computing system divides the image 502 into a plurality of sub-images 504, and passes each sub-image 504 to the deep learning model 506 (e.g., a residual neural network) for feature extraction. For example, the computing system can divide the image 502 into a pre-defined array of image grids. Each sub-image may or may not contain user-defined local features 509. In another example, the computing system divides the image 502 in a way such that every sub-image contains at least one local feature.

The deep learning model 506 receives the sub-image 504 as an input and outputs a corresponding feature vector (e.g., the feature vector 507a), indicative of the presence or absence of user-defined local features 509 on the sub image 504. In some embodiments, the deep learning model 506 has previously been trained in a process as described in FIG. 3. In some embodiments, the deep learning model 506 is a deep learning classification neural network that has the last softmax layer removed.

After the deep learning model 506 generates respective feature vectors for sub-images 504 of the image 502, the computing system concatenates all feature vectors to generate an integrated feature vector 508. The integrated feature vector 508 represents all the local features on the image 502. The computing system then sends the integrated feature vector 508 to a plurality of binary classifiers such as SVMs 510a-c to predict classification results 512. In some embodiments, each SVM has previously been trained (e.g., by the second training phase 305 of FIG. 3) to receive a feature vector and to predict whether a particular type of object (e.g., type of clothes) is present on the. For example, each SVM can output a probability indicating the likelihood that a particular type of clothes is present in the integrated feature vector 508 representative of the image 502. Although only three different SVMs (e.g., SVM 510a-c) are illustrated on FIG. 5, in actual implementation, there can be more or fewer number of SVMs corresponding to the number of different types of clothes to be detected.

FIG. 6 is a flowchart diagram of a method 600 for performing an automated machine setting selection based on image detection and classification results produced through local feature extraction, in accordance with some embodiments. For convenience, the method 600 will be described as being performed by a computing system including multiple servers connected via a network, wherein each server of the computing system is dedicated to performing a specific task. For example, the computing system can include a training model server (e.g., the training model server 122 of FIG. 1A) and an appliance server (e.g., the computing system 130' of FIG. 1C). In some embodiments, the machine is a first machine (e.g., a laundry machine (e.g., washing machine or dryer), a smart oven for cooking various food items or food ingredients in a dish, a smart refrigerator for storing various food items, etc.) having one or more processors, a camera, and memory (602).

As the first step, the computing system captures one or more images of an unorganized collection of items (e.g., items are randomly distributed in a confined space and may occlude one another in various ways) in a first machine (e.g., laundry inside a laundry machine, food ingredients inside a smart oven or wok, food items inside a smart refrigerator, etc.) (604). For example, the computing system can control a camera mounted on a window of the machine (e.g., the laundry machine, or the smart oven or wok, or the smart refrigerator, etc.) to capture the one or more images. In some embodiments, the machine (e.g., the laundry machine) shifts the unorganized collection of items inside the machine (e.g., the laundry inside the laundry machine, or the food ingredients inside of the smart oven or wok) after capturing a respective one of the one or more images. For example, the laundry machine rotates its drum containing the laundry by a predefined amount (e.g., half a turn) between each two consecutive image capturing sessions to get the clothing items in the laundry to shift relative to one another and to get different views of clothing items inside the laundry machine. This helps to increase the recognition accuracy across multiple images before the machine setting is changed based on the result of the clothes type determination.

After obtaining the one or more images, the computing system determines one or more item types of the unorganized collection of items (e.g., clothes types of the laundry, ingredient types of the food in the oven or wok, food item types of the food items in the refrigerator, etc.) from each of the one or more images (606). For example, the clothes types can include shirts, dresses, jeans, khakis, blouses, and so on. In some embodiments, the computing system determines the one or more clothes types using an image processing model with a feature extractor and a plurality of support vector machines. In another example, the ingredient types include chicken cubes, pork slices, beef stripes, potato chunks, lettuce leaves, string bean segments, diced onion, crushed tomato, etc. In another example, the food item types include juice, milk, yogurt, peaches, apples, watermelon, bacon, cheese slices, various types of condiments, etc.

As the first step of the image processing model, the computing system divides a respective image in the one or more images into a respective plurality of sub-regions (608). In some embodiments, a sub-region is a rectangular grid of a portion of an image (e.g., the sub-image 504 of FIG. 5). For example, the computing system can divide the respective image evenly into the respective plurality of sub-regions, or can divide the respective image based on the presence of user-defined local features such that each sub-region comprises at least one local feature.

The computing system then performs feature detection on the respective plurality of sub-regions to obtain a respective plurality of regional feature vectors (e.g., feature vector 507a-c of FIG. 5) (610). A regional feature vector indicates characteristics for a plurality of predefined local item features (e.g., local clothes features (e.g., fur collar, shirt button, jeans stitches, etc.), local food ingredient features (e.g., different types of meat fibers, chicken skin, leaf veins, etc.), local packaging or food item features (e.g., carton top, lids, can, trademarks for well-known food items, etc.)) in a sub-region of an image. In some embodiments, the predefined local item features (e.g., local clothes features, local food ingredient features, local food item features, etc.) include a plurality of manually identified local item feature labels (e.g., clothes feature labels, including for example, feature labels corresponding to presence of wool texture, stitch, fur, lace, band, jean cloth pattern, jean stitch, shirt corner, or shirt buttons, food ingredient feature labels, food item feature labels, etc.). Each of these manually identified item feature labels (e.g., cloth feature labels, food ingredient labels, food item labels, etc.) are for a characteristic of a particular type of item (e.g., clothing, food ingredient, food item, etc.) that require special treatment or handling by the machine (e.g., laundry machine (e.g., special drying or washing cycles, temperatures, etc.), smart oven, smart refrigerator, etc.). These item feature labels (e.g., clothes feature labels, food ingredient labels, food item labels, etc.) are easy for a human or expert to define and training images having local features (e.g., local clothes features, local food ingredient features, and local food item features, etc.) corresponding to these item feature labels (e.g., local cloth feature labels, local food ingredient features, and local food item features, etc.) are labeled by the human and expert accordingly to create a training dataset for the feature extraction model. In some embodiments, performing feature detection on the respective plurality of sub-regions to obtain the respective plurality of regional feature vectors for these item feature labels (e.g., clothes feature labels, food ingredient labels, and food item labels, etc.)) include obtaining respective machine generated latent features corresponding to the plurality of manually identified item feature labels through a machine learning model. The feature extraction through machine learning is much more effective and efficient in defining a feature vector for each item feature label than using a human expert to manually defined the feature vector. In some embodiments, a respective machine generated regional feature vector can indicate the presence or absence of a local item feature (e.g., local clothes feature (e.g., wool texture, stitch, fur, lace, band, jean cloth pattern, jean stitch, shirt corner, or shirt buttons)) in a sub-region of the image. In some embodiments, the computing system uses a deep learning image processing model (e.g., deep learning model 506 of FIG. 5) to perform feature detection. For example, the deep learning image processing model may be a residual neural network. The deep learning image processing model may have been previously trained on a remote computing system as described in FIG. 3. In some embodiments, the deep learning model was generated in a training process comprising: receiving a set of training data (e.g., images of clothes in a laundry machine) (e.g., engineers define local features to acquire image samples where the defined clothes features are dominant); dividing the set of training data into a plurality of subsets (e.g., using user-defined feature detection or recognition models, or manually label the subsets of images or portions of images), each subset corresponding one or more of the plurality of predefined local item feature (e.g., local clothes features, local food ingredient features, and local food item features, etc.) and having corresponding one or more item feature labels (e.g., clothes feature labels, food ingredient labels, and food item labels, etc.); and training the deep learning model using the set of training data with corresponding item feature labels.

After obtaining the respective plurality of regional feature vectors for the respective image, the computing system generates an integrated feature vector for the respective image by combining (e.g., concatenating) the respective plurality of regional feature vectors (612) for the respective image. The integrated feature vector for the respective image indicates the presence or absence of predefined local item feature (e.g., local clothes features, local food ingredient features, and local food item features, etc.) on the respective image of the one or more images of the unorganized collection of items (e.g., the laundry, the content of an oven, or the content of a refrigerator, etc.).

The computing system then applies a plurality of binary classifiers to the integrated feature vector for the respective image (614). Each respective binary classifier of the plurality of binary classifiers is configured to receive the integrated feature vector and determine if an item type (e.g., clothes type, food ingredient type, food item type, etc.) associated with the respective binary classifier exists in the respective image based on the integrated feature vector for the respective image. In some embodiments, each binary classifier is configured to receive a feature vector (e.g., each regional feature vector) indicating characteristics for the plurality of predefined local item features (e.g., local clothes features, local food ingredient features, and local food item features, etc.) and determine if an associated item type (e.g., clothes type, food ingredient, food item, etc.) exists in a respective sub-region corresponding to the feature vector. For example, a binary classifier may be an SVM (e.g., SVM 510*a*-*c* of FIG. 5) that receives the feature vector (e.g., indicating the presence or absence of user-defined features) and outputs whether a particular type of time (e.g., clothes, food ingredient, food item) is present on the image (or portion of image) that is being used to generate the feature vector. In some embodiments, each binary classifier is a support vector machine, and the support vector machine is trained on feature vectors of the plurality of sub-regions generated by a deep learning model (e.g., feature vectors generated by the deep learning model from images (or portions of images) containing a respective type of clothes feature corresponding to a respective one of the plurality of manually defined item feature labels). In some embodiments, the feature vector is obtained from a layer of the deep learning model other than the output layer of the deep learning model (e.g., the feature vector is obtained from one or two layer preceding the output layer of the deep learning model).

Finally, after obtaining the predicted item types for the unorganized collection of items (e.g., clothes types from the laundry, ingredient types from the content of the oven or wok, food item types from the content of the refrigerator, etc.), the computing system selects a machine setting for the machine based on the determined one or more item types (616). For example, the computing system can select a setting that minimizes damage to clothes (e.g., if the image processing model predicts that there are delicate clothes in the laundry machine), or that optimizing laundry results, or that saves laundry time.

As disclosed herein, the above technique helps to detect clothes types inside a laundry machine with high accuracy with the advantage that it achieves a high overall performance with limited training data and/or input data. This is especially true when compared to the case where a deep learning method is used to recognize objects. A pure deep learning method requires little human knowledge interference, but require a huge amount of labeled training data as well as considerable variations among the labeled data to achieve good performance. The presently disclosed technique focuses more on local feature (e.g., as opposed to the features of an object as a whole) of objects that are to be recognized or detected for object detection and recognition, and as a result, despite of the occluded and deformed shapes of the whole objects, this technique provides better and robust information for model to learn and improve. Furthermore, by using a hybrid of deep learning and traditional engineering approaches, the learning direction of the model is guided by professional human knowledge, which largely reduced the amount and variation of training data needed, and at the same time improved the overall performance and training efficiency.

As described herein, the construction and training of the object detection/recognition model includes: (1) Preparation: (i) obtaining images of same or different types of clothes inside the machine, which are labeled with the clothes type, local feature and location thereof in the images; and (ii) a list of local features of different clothes types. (2) Training the deep learning model: getting a part (~50%) of the above images for a first training stage; dividing every image into sub-portions using a grid, and the sub-portion of the image at every grid location is given a label of the local feature present in the sub-portion of the image; training a deep learning classification neural network, with the sub-portions of the images as input and its local feature label as output; and by excluding the last softmax layer, the network is a feature extractor which takes in a sub-portion of an image and outputs a feature vector representing features present in the sub-portion of the image. (3) Training the SVM model: getting the other part (~50%) of the above images for a second stage; for every image, dividing it into sub-portions in accordance with the grid and inputting each of the sub-portions into the feature extractor of the first stage, which yield the feature vector for each sub-portion; then concatenating the feature vector of the sub-portions belonging to the same image as an integrated feature vector; for every clothes type, training a SVM model with the large feature vector for each image as input and a label indicating whether it contains that type of clothes.

When using the constructed and trained model to determine presence of clothes types in an input image, the determination includes two stages: (1) obtaining an integrated feature vector of the image. To do so, first dividing the image into sub-portions in accordance with the grid; inputting each sub-portion to the feature extractor, which outputs a feature vector for that sub-portion; then concatenating the feature vector for the sub-portions together into the integrated feature vector for the input image. (2) Detecting whether the image contains every type of clothes. To do so, the integrated feature vector from the first step is input into the corresponding SVM model for each type of clothes; then, each SVM model will output a number (1 or 0) with a probability, indicating how likely that type of clothes is present in the image.

Although clothes recognition is used as an example application of the technique described herein, clothes type can be replaced with other object types, and corresponding local features can be replaced with local features corresponding to the other object types (e.g., local features corresponding to food item shapes, textures, decorations, and etc. for portions of the food items). In some embodiments, different grids can be used to divide the images, to accommodate size or shapes of the local features. In some embodiments, different variants of the different deep learning network structure can be used to extract the feature vectors for different types of objects. In some embodiments, different algorithms can be used for the second stage of the object recognition/detection process.

Figure 7:
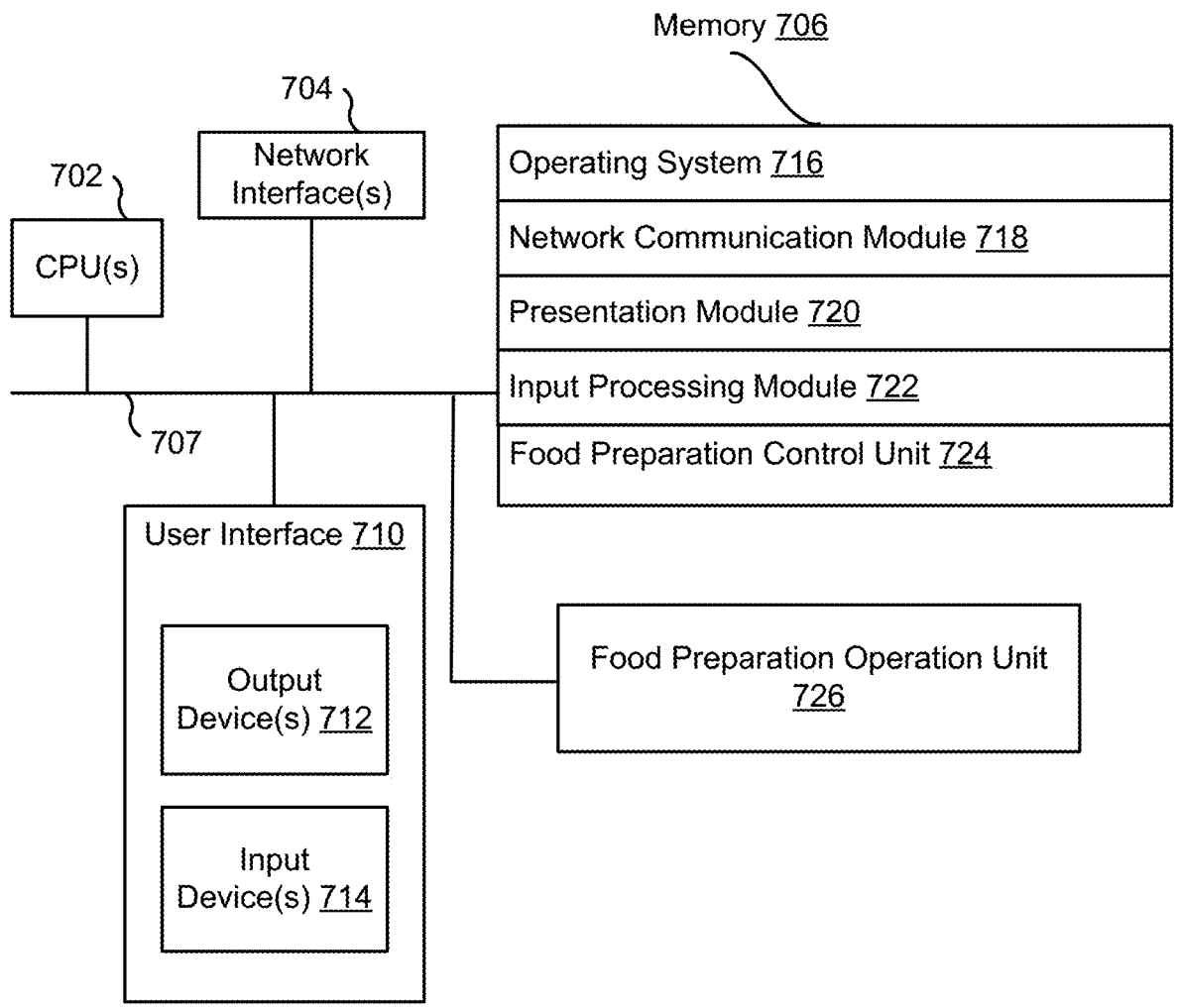
FIG. 7 is a diagram of an exemplary home appliance, in accordance with some embodiments.

FIG. 7 is a block diagram of an exemplary home appliance 700, in accordance with some embodiments. The home appliance 700 can serve as appliance 110, 112, 114, 140, 140', 200, 201, 202, 203, 204, for example, in various embodiments. The home appliance 700 includes one or more processing units (CPUs) 702, one or more network interfaces 704, memory 706, and one or more communication buses 708 for interconnecting these components (sometimes called a chipset). Home appliance 700 also includes a user interface 710. User interface 710 includes one or more output devices 712 that enable presentation of media content, including one or more speakers and/or one or more visual displays. User interface 710 also includes one or more input devices 714, including user interface components that facilitate user input such as a keyboard, a mouse, a voice-command input unit or microphone, a touch screen display, a touch-sensitive input pad, a gesture capturing camera, or other input buttons or controls. In some embodiments, home appliance 700 further includes sensors (e.g., sensors 141, 142), which senses operating environment information of the home appliance 600. Sensors include but are not limited to one or more heat sensors, light sensors, one or more cameras, humidity sensors, one or more motion sensors, one or more biological sensors (e.g., a galvanic skin resistance sensor, a pulse oximeter, and the like), weight sensors, spectrometers, and other sensors. Furthermore, the home appliance 600 includes home appliance operation unit 726 (e.g., heating means that are based on electricity, induction, gas, radiation, etc.). Memory 706 includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 606, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

- operating system 716 including procedures for handling various basic system services and for performing hardware dependent tasks;
- network communication module 718 for connecting to external services via one or more network interfaces 704 (wired or wireless);
- presentation module 720 for enabling presentation of information;
- input processing module 722 for detecting one or more user inputs or interactions from one of the one or more input devices 714 and interpreting the detected input or interaction;
- home appliance control unit 724, which controls the home appliance 700, including but not limited to modules of appliance 140 or 140' as forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified

What is claimed is:

1. A method, comprising:
at a first machine having one or more processors, a camera, and memory:
capturing one or more images of an unorganized collection of items inside the first machine;
determining one or more item types of the unorganized collection of items from the one or more images, comprising:
dividing a respective image in the one or more images into a respective plurality of sub-regions;
performing feature detection on the respective plurality of sub-regions of the respective image to obtain a respective plurality of regional feature vectors, wherein a regional feature vector for a sub-region indicates characteristics for a plurality of predefined local item features for the sub-region; and
generating an integrated feature vector for the respective image by combining the respective plurality of regional feature vectors; and
applying a plurality of binary classifiers to the integrated feature vector for the respective image, wherein a respective binary classifier of the plurality of binary classifiers is configured to receive the integrated feature vector and determine if an item type associated with the binary classifier exists in the respective image based on the integrated feature vector for the respective image; and
selecting a machine setting for the first machine based on the determined one or more item types in the unorganized collection of items.

2. The method of claim 1, wherein the first machine shifts the unorganized collection of items inside the first machine after capturing a respective one of the one or more images.

3. The method of claim 1, wherein the predefined local item features include a plurality of manually identified local item feature labels, and performing feature detection on the respective plurality of sub-regions to obtain the respective plurality of regional feature vectors include obtaining respective machine generated latent features corresponding to the plurality of manually identified local item feature labels through a machine learning model.

4. The method of claim 1, wherein the binary classifier is a support vector machine, and wherein the support vector machine is trained on feature vectors of the plurality of sub-regions generated by a deep learning model.

5. The method of claim 4, wherein the feature vector is obtained from a layer of the deep learning model other than the output layer of the deep learning model.

6. The method of claim 4, wherein the deep learning model was generated in a training process including:
receiving a set of training data;
dividing the set of training data into a plurality of subsets, each subset corresponding one or more of the plurality of predefined local item features and having corresponding one or more local item feature labels; and
training the deep learning model using the set of training data with corresponding local item feature labels.

7. A machine, comprising:
one or more processors;
a camera; and
memory storing instructions, the instructions, when executed by the one or more processors, cause the processors to perform operations comprising:
capturing one or more images of an unorganized collection of items inside the machine;
determining one or more item types of the unorganized collection of items from the one or more images, comprising:
dividing a respective image in the one or more images into a respective plurality of sub-regions;
performing feature detection on the respective plurality of sub-regions of the respective image to obtain a respective plurality of regional feature vectors, wherein a regional feature vector for a sub-region indicates characteristics for a plurality of predefined local item features for the sub-region; and
generating an integrated feature vector for the respective image by combining the respective plurality of regional feature vectors; and
applying a plurality of binary classifiers to the integrated feature vector for the respective image, wherein a respective binary classifier of the plurality of binary classifiers is configured to receive the integrated feature vector and determine if an item type associated with the binary classifier exists in the respective image based on the integrated feature vector for the respective image; and
selecting a machine setting for the machine based on the determined one or more item types in the unorganized collection of items.

8. The machine of claim 7, wherein the machine shifts the unorganized collection of items inside the machine after capturing a respective one of the one or more images.

9. The machine of claim 7, wherein the predefined local item features include a plurality of manually identified local item feature labels, and performing feature detection on the respective plurality of sub-regions to obtain the respective plurality of regional feature vectors include obtaining respective machine generated latent features corresponding to the plurality of manually identified local item feature labels through a machine learning model.

10. The machine of claim 7, wherein the binary classifier is a support vector machine, and wherein the support vector machine is trained on feature vectors of the plurality of sub-regions generated by a deep learning model.

11. The machine of claim 10, wherein the feature vector is obtained from a layer of the deep learning model other than the output layer of the deep learning model.

12. The machine of claim 10, wherein the deep learning model was generated in a training process including:
receiving a set of training data;
dividing the set of training data into a plurality of subsets, each subset corresponding one or more of the plurality of predefined local item features and having corresponding one or more local item feature labels; and
training the deep learning model using the set of training data with corresponding local item feature labels.

13. A non-transitory computer-readable storage medium storing instructions, the instructions, when executed by one or more processors of a machine, cause the processors to perform operations comprising:
capturing one or more images of an unorganized collection of items inside the machine;
determining one or more item types of the unorganized collection of items from the one or more images, comprising:
dividing a respective image in the one or more images into a respective plurality of sub-regions;

performing feature detection on the respective plurality of sub-regions of the respective image to obtain a respective plurality of regional feature vectors, wherein a regional feature vector for a sub-region indicates characteristics for a plurality of predefined local item features for the sub-region; and generating an integrated feature vector for the respective image by combining the respective plurality of regional feature vectors; and applying a plurality of binary classifiers to the integrated feature vector for the respective image, wherein a respective binary classifier of the plurality of binary classifiers is configured to receive the integrated feature vector and determine if an item type associated with the binary classifier exists in the respective image based on the integrated feature vector for the respective image; and selecting a machine setting for the machine based on the determined one or more item types in the unorganized collection of items.

14. The computer-readable storage medium of claim 13, wherein the machine shifts the unorganized collection of items inside the machine after capturing a respective one of the one or more images.

15. The computer-readable storage medium of claim 13, wherein the predefined local item features include a plurality of manually identified local item feature labels, and performing feature detection on the respective plurality of sub-regions to obtain the respective plurality of regional feature vectors include obtaining respective machine generated latent features corresponding to the plurality of manually identified local item feature labels through a machine learning model.

16. The computer-readable storage medium of claim 13, wherein the binary classifier is a support vector machine, and wherein the support vector machine is trained on feature vectors of the plurality of sub-regions generated by a deep learning model.

17. The computer-readable storage medium of claim 16, wherein the feature vector is obtained from a layer of the deep learning model other than the output layer of the deep learning model.

18. The computer-readable storage medium of claim 16, wherein the deep learning model was generated in a training process including:

receiving a set of training data;

dividing the set of training data into a plurality of subsets, each subset corresponding one or more of the plurality of predefined local item features and having corresponding one or more local item feature labels; and training the deep learning model using the set of training data with corresponding local item feature labels.

* * * * *